US011409343B2

(12) United States Patent
Chakraborty et al.

(10) Patent No.: US 11,409,343 B2
(45) Date of Patent: Aug. 9, 2022

(54) QUANTUM COMPUTING ARRAY

(71) Applicant: INTERNATIONAL BUSINESS MACHINES CORPORATION, Armonk, NY (US)

(72) Inventors: Sudipto Chakraborty, Yorktown Heights, NY (US); Rajiv Joshi, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 16/865,330

(22) Filed: May 2, 2020

(65) Prior Publication Data
US 2021/0341979 A1 Nov. 4, 2021

(51) Int. Cl.
*G06F 1/20* (2006.01)
*G06N 10/00* (2022.01)
*G05B 19/042* (2006.01)

(52) U.S. Cl.
CPC .......... *G06F 1/206* (2013.01); *G05B 19/042* (2013.01); *G06N 10/00* (2019.01)

(58) Field of Classification Search
CPC ................. G06F 1/206; G05B 19/042; G05B 2219/24015; G06N 10/00
See application file for complete search history.

(56) References Cited

U.S. PATENT DOCUMENTS

| 8,260,144 | B2 | 9/2012 | Gupta et al. |
| 8,503,546 | B1 | 8/2013 | Ashrafi |
| 8,571,614 | B1 | 10/2013 | Mukhanov et al. |
| 8,786,476 | B2 | 7/2014 | Bunyk et al. |
| 9,331,875 | B2 | 5/2016 | Ashrafi |
| 9,509,274 | B2 | 11/2016 | Naaman et al. |
| 9,853,645 | B1 | 12/2017 | Mukhanov et al. |
| 10,192,168 | B2 | 1/2019 | Rigetti et al. |
| 10,621,503 | B1 | 4/2020 | Mueller et al. |
| 10,769,546 | B1 * | 9/2020 | Rigetti .................. H01L 39/045 |
| 10,817,463 | B1 * | 10/2020 | DeBenedictis ........ H03H 11/34 |

(Continued)

FOREIGN PATENT DOCUMENTS

| EP | 3 300 004 A1 | 3/2018 |
| EP | 3266063 B1 | 3/2020 |

OTHER PUBLICATIONS

List of IBM Patents or Patent Applications Treated as Related (2 pgs.).

(Continued)

*Primary Examiner* — Chun Cao
(74) *Attorney, Agent, or Firm* — Intelletek Law Group, PLLC; Gabriel Daniel, Esq.

(57) ABSTRACT

A quantum processing system includes a first set of control electronics operating at a first temperature. A second set of control electronics is communicatively coupled to the first set of control electronics and operating at a second controlled temperature that is lower than the first temperature. The second set of control electronics includes one or more circuits configured to perform a write and a read operation to one or more qubits. There is a qubit array that includes the one or more qubits and operating at a third controlled temperature that is lower than the second temperature. The qubit array is controlled by the second set of control electronics.

20 Claims, 9 Drawing Sheets

(56) References Cited

U.S. PATENT DOCUMENTS

| | | | |
|---|---|---|---|
| 2012/0328041 | A1 | 12/2012 | Chen et al. |
| 2016/0267032 | A1* | 9/2016 | Rigetti .................. G06N 10/00 |
| 2017/0026095 | A1 | 1/2017 | Ashrafi et al. |
| 2017/0346510 | A1 | 11/2017 | Chen et al. |
| 2018/0013426 | A1 | 8/2018 | Deurloo et al. |
| 2018/0302111 | A1 | 10/2018 | Chen et al. |
| 2019/0311296 | A1* | 10/2019 | Fan ........................ G06N 10/00 |
| 2020/0250564 | A1* | 8/2020 | Li ........................... G06N 10/00 |

OTHER PUBLICATIONS

Hornibrook, J.M. et al., "Cryogenic Control Architecture for Large-Scale Quantum Computing"; arXiv:1409.2202v1 [cond-mat.mes-hall] (2014); 8 pgs.

Bronn, N.T., et al., "Fast, High-Fidelity Readout of Multiple Qubits"; Journal of Physics: Conf. (2017); Ser. 834; 11 pgs.

Van Dijk, J.P.G., et al., "Impact of Classical Control Electronics on Qubit Fidelity"; Physical Review Applied (2019) vol. 12; 20 pgs.

Geck, L. et al., "Control Electronics for Semiconductor Spin Qubits"; Quantum Sci. Technol. (2020), vol. 5; 19 pgs.

Salathe, Y., "Low-Latency Digital Signal Processing for Feedback and Feedforward in Quantum Computing and Communication"; arXiv:1709.01030v1 [quant-ph] (2017); 20 pgs.

Skach, C. et al., "How New DAC Technologies are Changing Signal Generation For Test" Electronic Design (2017); 14 pgs.

Guibord, M. "Digital-to-Analog Converter (DAC) Output Response"; Texas Instruments (2017); 23 pgs.

Tektronix, "Overcoming RF Signal Generation Challenges in Quantum Computing with New DAC Technologies"; White Paper; www.Tek.com (2017); 12 pgs.

Mastriani, M. et al., "Quantum Spectral Analysis: Frequency in Time, with Applications to Signal and Image Processing"; Quantum Communications Lab, Qubit Reset LLC (2016); 140 pgs (Part 1, 70 pgs).

Mastriani, M. et al., "Quantum Spectral Analysis: Frequency in Time, with Applications to Signal and Image Processing"; Quantum Communications Lab, Qubit Reset LLC (2016); 140 pgs (Part 2, 70 pgs).

Barends, R. et al., "Supplementary Information for Superconducting Quantum Circuits at the Surface Code Threshold for Fault Tolerance"; Nature (2014); vol. 508:7497, 12 pgs.

Bishnu, P. et al., "Cryo-CMOS Circuits and Systems for Quantum Computing Applications"; IEEE Journal of Solid-State Circuits (2018); vol. 53:1, pp. 309-321.

Reilly, D. J. et al., "Engineering the Quantum-Classical Interface of Solid-State Qubits"; NPJ Quantum Information (2015); vol. 1:1; 10 pgs.

International Search Report and Written Opinion dated Jul. 23, 2021 in related application No. PCT/EP2021/059968, 15 pgs.

Ding, Y. et al., "Systematic Crosstalk Mitigation for Superconducting Qubits via Frequency-Aware Compilation"; 53rd Annual IEEE/ACM International Symposium on Microarchitecture (2020); 14 pgs.

Helmer, F. et al., "Cavity Grid for Scalable Quantume Computation with Superconducting Circuits"; EPL : A Letters Journal Exploring the Frontiers of Physics (2009); vol. 85:5, 6 pgs.

Versluis, R. et al., "Scalable Quantum Circuit and Control for a Superconducting Surface Code"; ARXIV.org, Cornell University Library (2016); retrieved Jul. 14, 2021; 10 pgs.

International Search Report and Written Opinion dated Jul. 29, 2021 in related application No. PCT/EP2021/059518, 14 pgs.

\* cited by examiner

QUANTUM COMPUTING ARRAY

BACKGROUND

Technical Field

The present disclosure generally relates to superconducting devices, and more particularly, scalable qubit architectures.

Description of the Related Art

Superconducting quantum computing is an implementation of a quantum computer in superconducting electronic circuits. Quantum computation studies the application of quantum phenomena for information processing and communication. Various models of quantum computation exist, and the most popular models include the concepts of qubits and quantum gates. A qubit is a generalization of a bit that has two possible states, but can be in a quantum superposition of both states. A quantum gate is a generalization of a logic gate, however the quantum gate describes the transformation that one or more qubits will experience after the gate is applied on them, given their initial state.

SUMMARY

According to various embodiments, a method and system are provided for controlling a qubit in a quantum processing system. There is first set of control electronics operating at a first temperature. There is a second set of control electronics communicatively coupled to the first set of control electronics and operating at a second controlled temperature that is lower than the first temperature. The second set of control electronics include one or more circuits configured to perform a write operation to one or more qubits, and one or more circuits configured to perform a read operation to the one or more qubits. There is a qubit array that includes the one or more qubits and operating at a third controlled temperature that is lower than the second temperature. The qubit array is controlled by the second set of control electronics.

In one embodiment, the first temperature is substantially at room temperature.

In one embodiment, there is a first set of interconnects between the first and second set of control electronics, configured to at least one of: control, monitor, or provide one or more reference signals to the second set of control electronics, including at least one of a voltage reference, a current reference, or a clock reference, which do not scale with a number of qubits in the qubit array. There may be a second set of interconnects between the second set of control electronics and the qubit array, configured to at least one of: monitor or provide dynamic signals to the one or more qubits of the qubit array, wherein there is one interconnect in the second set of interconnects for each of the one or more qubits of the qubit array.

In one embodiment, the second set of control electronics includes a plurality of write controllers, wherein each write controller includes an independently programmable qubit control circuit. There may be a first signal processing element configured to process a common part of a waveform shape for amplitude and phase, wherein each write controller includes a second signal processing element that is configured to process a part that is individual to a qubit. Each independently programmable element of a write controller may be configured to process a unique combination of amplitude and phase of a waveform shape for a corresponding qubit in the qubit array.

In one embodiment, the first signal processing element includes a high-resolution digital to analog converter, and the second signal processing element includes a low-resolution digital to analog converter that is lower in resolution than the first signal processing element.

In one embodiment, the qubit array includes a plurality of clusters, each cluster being arranged to provide a maximum separation of a resonance frequency of its corresponding qubit to minimize a cross talk between adjacent clusters of the plurality of clusters.

In one embodiment, the second set of control electronics is in complementary metal oxide semiconductor (CMOS) technology.

In one embodiment, the second set of control electronics is further configured to provide a power management circuit for the qubit array.

In one embodiment, the second controlled temperature is a cryogenic temperature that is between 1 to 4 Kelvin.

In one embodiment, the third controlled temperature is a cryogenic temperature of approximately 240 mK.

In one embodiment, the qubit array is divided into groups, each group including a diverse set of center frequencies of qubits such that a cross talk between adjacent qubits is reduced.

In one embodiment, the at least one of the one or more circuits configured to perform the write operation includes two separate multiplier mixers to obtain an upper and a lower sideband separately.

According to one embodiment, a method of controlling an array of qubits is provided. A first set of control electronics is operated at a first temperature. A second set of control electronics communicatively coupled to the first set of control electronics is operated at a second controlled temperature that is lower than the first temperature. The second set of control electronics include one or more circuits configured to perform a write operation to one or more qubits, and one or more circuits configured to perform a read operation to the one or more qubits. A qubit array comprising the one or more qubits is operated at a third controlled temperature that is lower than the second temperature. The qubit array is controlled by the second set of control electronics.

In one embodiment, the first temperature is substantially at room temperature. The second controlled temperature is a cryogenic temperature that is between 1 to 4 Kelvin. The third controlled temperature is a cryogenic temperature of approximately 240 mK.

In one embodiment, a first set of interconnects is provided between the first and second set of control electronics to at least one of: control, monitor, or provide one or more reference signals to the second set of control electronics, including at least one of a voltage reference, a current reference, or a clock reference, which do not scale with a number of qubits in the qubit array. A second set of interconnects is provided between the second set of control electronics and the qubit array to at least one of: monitor or provide dynamic signals to the one or more qubits of the qubit array. There is one interconnect in the second set of interconnects for each of the one or more qubits of the qubit array.

In one embodiment, a common part of a waveform shape is processed for amplitude and phase with a first signal processing element that is outside a plurality of write controllers. An individual portion of the waveform signal is processed with a second signal processing element that is local to a write controller of the plurality of write controllers.

In one embodiment, the qubit array is divided into groups, each group comprising a diverse set of center frequencies of qubits such that a cross talk between adjacent qubits is reduced.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to superconducting devices, and more particularly, power efficient and scalable qubit architectures. The electromagnetic energy associated with a qubit can be stored in so-called Josephson junctions and in the capacitive and inductive elements that are used to form the qubit. In one example, to read out the qubit state, a microwave signal is applied to the microwave readout cavity that couples to the qubit at the cavity frequency. For example, a qubit can be excited directly by an electrical waveform with a predetermined amplitude, phase, and frequency. The frequency of the exciting waveform may be the resonance frequency of the qubit, and the shape of the waveform could be gaussian or a set of derivatives thereof. Each qubit can also be excited by another qubit that is weakly coupled to is using capacitive mechanisms.

The transmitted microwave signal goes through multiple thermal isolation stages and low-noise amplifiers that are used to block or reduce the noise and improve the signal-to-noise ratio. Much of the process is performed in a cold environment (e.g., in a cryogenic chamber), while the microwave signal of a qubit is ultimately measured at room temperature. The amplitude and/or phase of the returned/output microwave signal carries information about the qubit state, such as whether the qubit has dephased to the ground or excited state. The microwave signal carrying the quantum information about the qubit state is usually weak (e.g., on the order of a few microwave photons). To measure this weak signal with room temperature electronics (i.e., outside the refrigerated environment), low-noise quantum-limited amplifiers (QLAs), such as Josephson amplifiers and travelling-wave parametric amplifiers (TWPAs), may be used as preamplifiers (i.e., first amplification stage) at the output of the quantum system to boost the quantum signal, while adding the minimum amount of noise as dictated by quantum mechanics, in order to improve the signal to noise ratio of the output chain. In addition to Josephson amplifiers, certain Josephson microwave components that use Josephson amplifiers or Josephson mixers such as Josephson circulators, Josephson isolators, and Josephson mixers can be used in scalable quantum processors.

The ability to include more qubits is salient to being able to realize the potential of quantum computers. Reduction of the temperature of the computing environment to cryogenic temperatures is used for the quantum processor to function. Generally, performance increases as temperature is lowered, for example by reducing the residual thermally-excited state qubit population and decreasing the thermal broadening of the qubit transition frequencies. Accordingly, the lower the temperature, the better for the performance of a quantum processor.

Applicants have recognized that to increase the computational power and reliability of a quantum computer, improvements can be made along two main dimensions. First, is the qubit count itself. The more qubits in a quantum processor, the more states can in principle be manipulated and stored. Second is low error rates, which is relevant to manipulate qubit states accurately and perform sequential operations that provide consistent results and not merely unreliable data. Thus, to improve fault tolerance of a quantum computer, a large number of physical qubits should be used to store a logical quantum bit. In this way, the local information is delocalized such that the quantum computer is less susceptible to local errors and the performance of measurements in the qubits' eigenbasis, similar to parity checks of classical computers, thereby advancing to a more fault tolerant quantum bit.

Example Architecture

Figure 1:
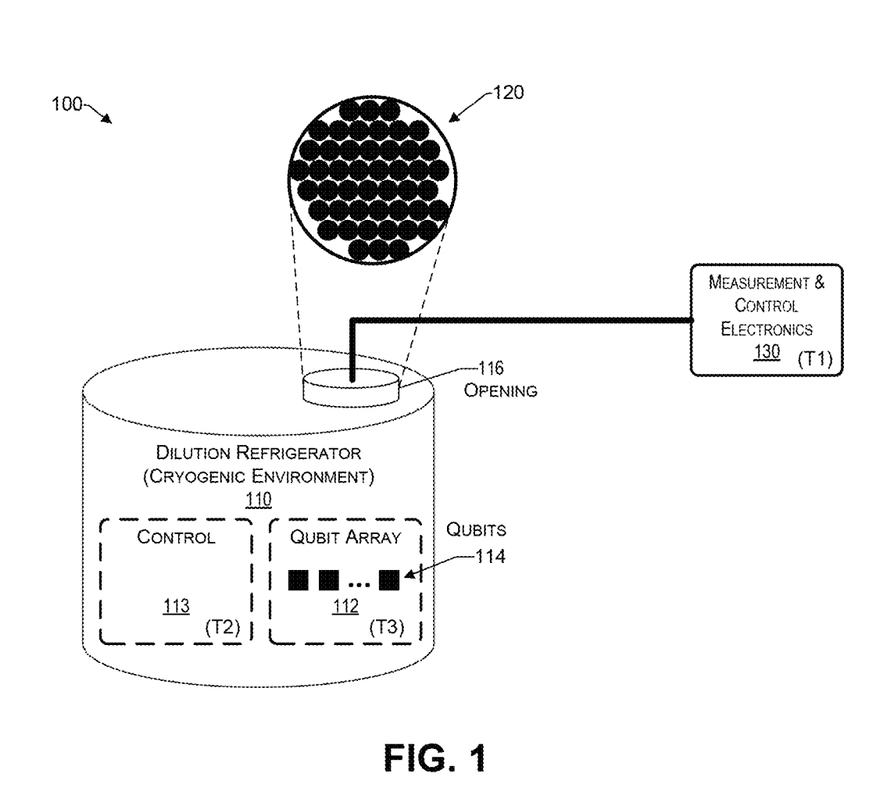
FIG. 1 illustrates an example architecture of a quantum computing system, consistent with an illustrative embodiment.

FIG. 1 illustrates an example architecture 100 of a quantum computing system, consistent with an illustrative embodiment. The architecture 100 includes a qubit array 112 comprising a plurality of qubits 114. The qubit array 112 is located in a refrigeration unit 110, which may be a dilution refrigerator. The refrigeration unit may also house a control circuit block 113, sometimes referred to herein as a second set of control electronics. For example, the control circuit block 113 may be configured to provide various functions, such as perform write and/or read operations to one or more qubits in the qubit array 112. In one embodiment, the control circuit block 113 is also configured to provide power management for the control circuitry of the control circuit block 113 and readout circuitry, discussed in more detail in FIG. 6.

It should be noted that due to the temperature characteristics in the second controlled temperature, it is challenging to implement a bandgap reference system in such a zone. Accordingly, in one embodiment, a bandgap reference system is implemented at room temperature (T1), while the other parts of the power management system (such as the voltage to current converter, voltage or resistance (V/R) or other custom current generators, are implemented at low T by using the bandgap reference signal implemented at room temperature. Accordingly, by using such partitioning of the power management system, the architecture described herein is able to achieve a high accuracy bandgap reference, while providing a low noise power management system by providing a significant portion of the power management circuitry in the cryogenic environment of the second controlled temperature (T2).

In one embodiment, the refrigeration unit 110 may have a plurality of chambers or regions, each having a different controlled temperature. For example, the control circuit block 113 may be at a controlled temperature that is 1K to 4K, whereas the qubit array 112 is at a controlled temperature of 240 mK or lower. A dilution refrigerator is a cryogenic device that provides continuous cooling to temperatures as low as 2 mK. Most of the physical volume of the architecture 100 is due to the large size of the refrigeration unit 110. The best performance for the qubits can be obtained at the lowest temperature. However, due to thermodynamic efficiency, a coldest temperature may not be readily achieved in one step from room temperature. In this regard, applicants have determined that operating ancillary electronics at 240 mK is energy inefficient and therefore not placed in the third controlled temperature environment (T2), but in a second controlled temperature environment (T2). The cooling materials/agents (e.g., liquid Nitrogen at 77K, Liquid He for 4K and lower) used in each of these temperature ranges may also be different.

In one embodiment, to reach the near-absolute zero temperatures at which the system operates, the refrigeration unit 110 may us liquid helium as a coolant. For example, a "dry" refrigeration unit may operate with two gaseous closed-cycle: one of He-4 that takes the fridge down to 3K (the "pulse tube" cycle) and another of He-3/He-4 mixture that takes the fridge down to 10 mK, or the lowest temperature (the "dilution" cycle). The only liquid in the system is inside the fridge, where the He-3/He-4 mixture condenses.

There is a measurement and control unit 130, sometimes referred to herein as the first set of control electronics, that is outside of the refrigeration unit 110. For example, the measurement and control unit 130 may operate at room temperature. The measurement and control unit 130 is able to communicate with the quantum processor through an opening 116, sometimes referred to as a bulkhead of the dilution refrigerator 110, that also forms a hermetic seal separating the ambient atmospheric pressure from the vacuum pressure of the cryostat under operation. A practical challenge in known refrigeration devices that house qubits 114 is that the number of qubits that can be accommodated in the refrigeration unit is limited due the number of wires between the measurement and control unit 130 and the qubits 114 measured thereby.

As the number of qubits in the qubit array 114 increases, for example above 53 qubits to hundreds, thousands, or more, the opening 116 may not be large enough to accommodate all the lines (e.g., wires) 120 supporting the qubit array 112 in the dilution refrigerator 110. Stated differently, access to the vacuum environment of the dilution refrigerator 110 is limited to the number of connectors that can fit through the bulkhead opening 116.

Accordingly, in one aspect, what is provided herein is an architecture that substantially reduces the number lines 120 between a measurement and control unit 130 and a qubit array 112 that is housed in a refrigerated environment. In one embodiment, the number of lines 120 is reduced to approximately 10 (e.g., power management interface, clock interface, instrumentation interface, digital interface, etc.), irrespective of the size of the qubit array 112.

Figure 2:
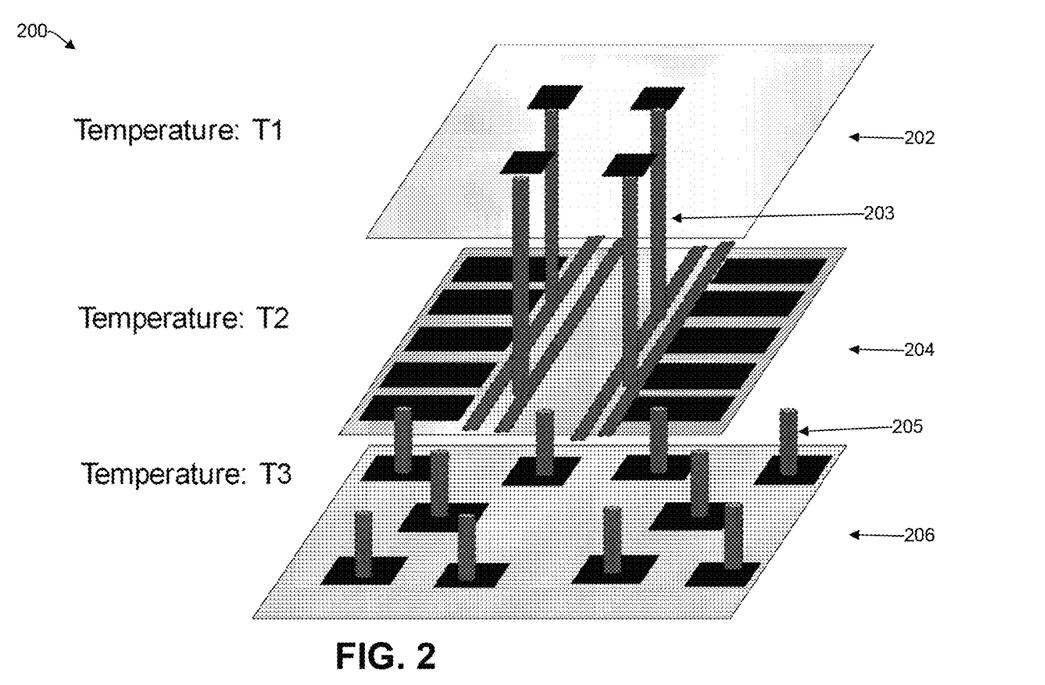
FIG. 2 illustrates a qubit system having three main components, consistent with an illustrative embodiment.

Reference now is made to FIG. 2, which illustrates a qubit system 200 having three main components, separated into three different temperature zones, namely: (i) a first set of control electronics 202 (representing the measurement and control electronics 130 in FIG. 1), which is operated at a first temperature (e.g., room temperature); (ii) a second set of control electronics 204 (representing the control unit 113 in FIG. 1), which is operated at a second temperature (e.g., 1K to 4K); and (iii) a qubit array 206 (representing the qubit array 112 in FIG. 1), operated at a third temperature (e.g., 240 mK) that is lower than the second temperature. In one embodiment, the second set of control electronics is in complementary metal oxide semiconductor (CMOS) technology.

There is a first set of interconnects 203 between the first and second set of control electronics operative to at least one of control, monitor, or provide one or more reference signals, including at least one of a voltage reference, a current reference, or a clock reference, that does not scale with a number of qubits in the qubit array 206. There is a second set of interconnects 205 between the second set of control electronics 204 and the qubit array 206, operative to at least one of: monitor or provide dynamic signals to the one or more qubits of the qubit array, wherein there is one interconnect in the second set of interconnects for each of the one or more qubits of the qubit array.

Such partitioning and interconnection of different circuit components provides an advantageous usage of the electronics 202 and 204 to maximize dynamic range per unit power consumption of the system 200.

Referring back to FIG. 1, in one embodiment, the measurement and control electronics 130 includes a digital I/O. It may further include a power management unit (PMU) comprising one or more bandgap references and reference currents. The control circuit block 113 may comprise one or more integrated circuits that are kept at a cryogenic temperature, which provides a high-fidelity signal to the qubits 114 in the qubit array 112. Many parts of the control circuit block provide superior performance at cryo-temperature, thereby providing significant power reduction within the control circuit block 113. For example, the parts of the control circuit may include an arbitrary waveform generator, clock circuitry, mixer(s), output driver(s), etc. The mobility of a transistor increases, the ON resistance of transistors is reduced and the thermal noise is reduced at cryogenic temperatures. Further, the substrate conductivity is reduced, which improves the quality factor of inductors, favoring lower power consumption for the same performance compared to room temperature. Using this multi-temperature zone approach, the signaling between the measurement and control electronics block 130 and the control circuit block 113 occur using a substantially reduced number of connectors, thereby greatly simplifying the system design and instrumentation aspects such as fewer number of cables and assembly of components. Further, this multi-temperature zone approach favors the scalability of the qubits 114 to a large qubit array 112 system. In one aspect, the interface from the measurements and control electronics block 130 to the control circuit block 113 remains same, even when the number of 114 is increased.

The control circuit block 113 at the first cryogenic temperature uses several approaches to implement low power and provides high fidelity signaling to the qubits 114, discussed in more detail later. In one embodiment, the control circuit block includes a digital to analog converter (DAC) pair, a mixer pair, an attenuator, and an impedance matching network discussed in more detail later.

Example Block Diagrams

Figure 3A:
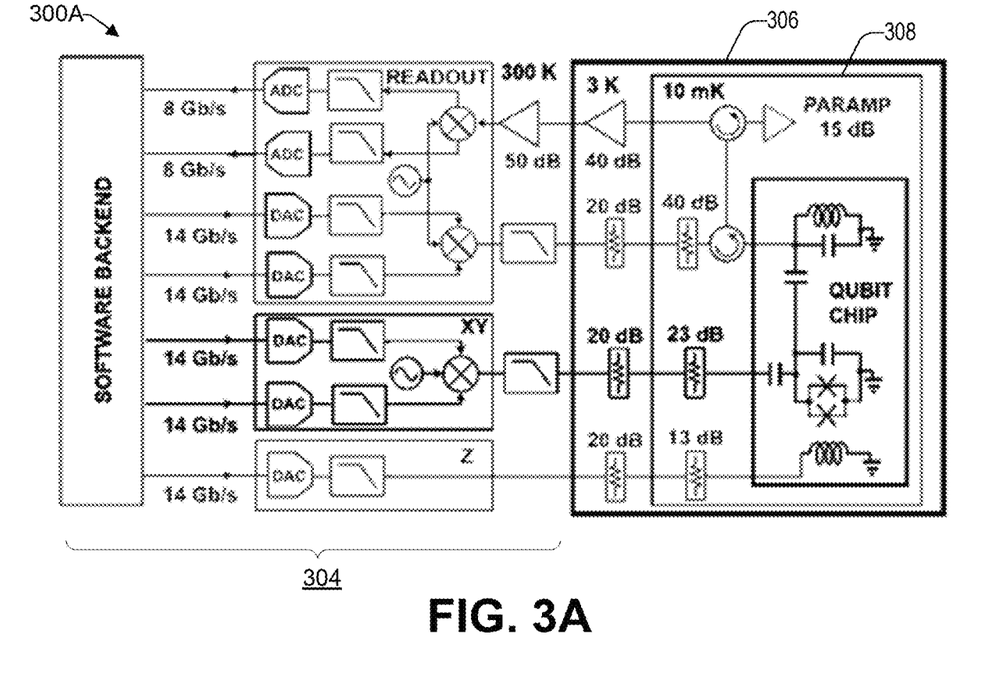
FIG. 3A illustrates a conventional qubit architecture.
Figure 3B:
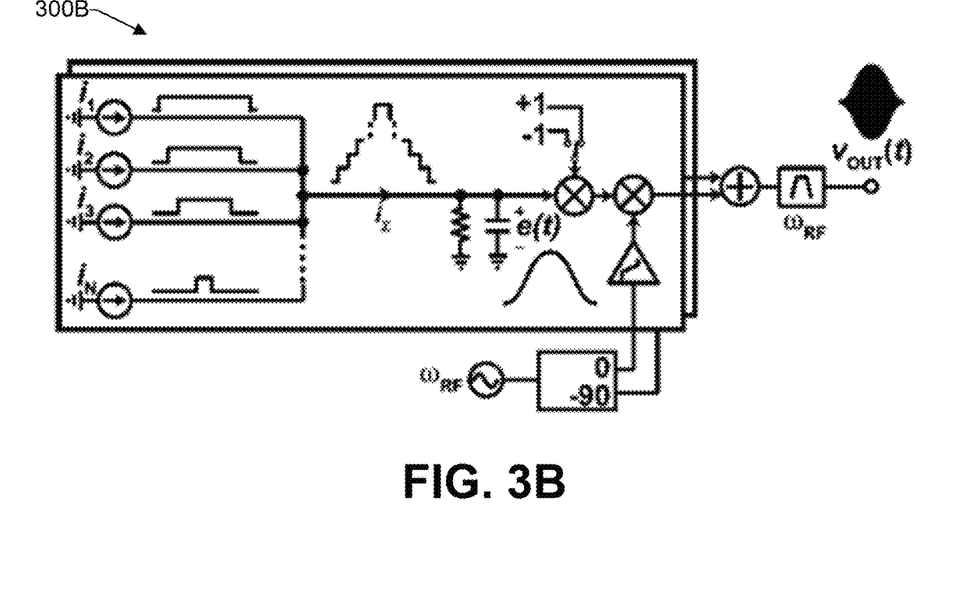
FIG. 3B illustrates standard control and readout hardware.

To appreciate the features of the present disclosure, it may be helpful to contrast them with known techniques. To that end, FIGS. 3A and 3B illustrate a conventional qubit architecture 300A and standard control and readout hardware 300B, respectively. As illustrated in FIG. 3A, there are three main temperatures of operation, including software and control logic 304 at room temperature, a first control layer 306 at 3K, and a qubit chip 308 at 10 mK. The architecture 300A dissipates a significant amount of power and involves a large number of interfaces between the control logic 304 and the cryogenic environment 306 and 308, thereby impeding scalability. For example, each digital to analog converter (DAC) consumes a significant amount of power and is not scalable at room temperature. In this regard, it is noted that power is proportional to dynamic range, which is related to signal to the noise ratio. For a same signal, thermal noise scales proportional to absolute temperature, thereby improving signal to noise ratio at low temperature for the same signal amplitude. Accordingly, to achieve a similar signal to noise ratio at room temperature would involve much higher power consumption.

In contrast to the known architecture of FIGS. 3A and 3B, the teachings herein provide, in various embodiments, one or more of: (i) a low sampling frequency of the DAC, leading to a substantially lower power consumption, (ii) an increase in dynamic range per milliwatts of power consumed by using a number of system/circuit/algorithmic approaches (e.g., a combination of waveform features of the waveforms used to excite each qubit, and providing a common feature using a low power waveform generator) discussed herein, and (iii) a built-in calibration to enhance dynamic range by processing DAC signals in current mode. For example, each block may use a built-in self calibration. Stated differently, each block may include its own independent signal analysis procedures to ensure that it consumes the least amount of power.

Figure 4:
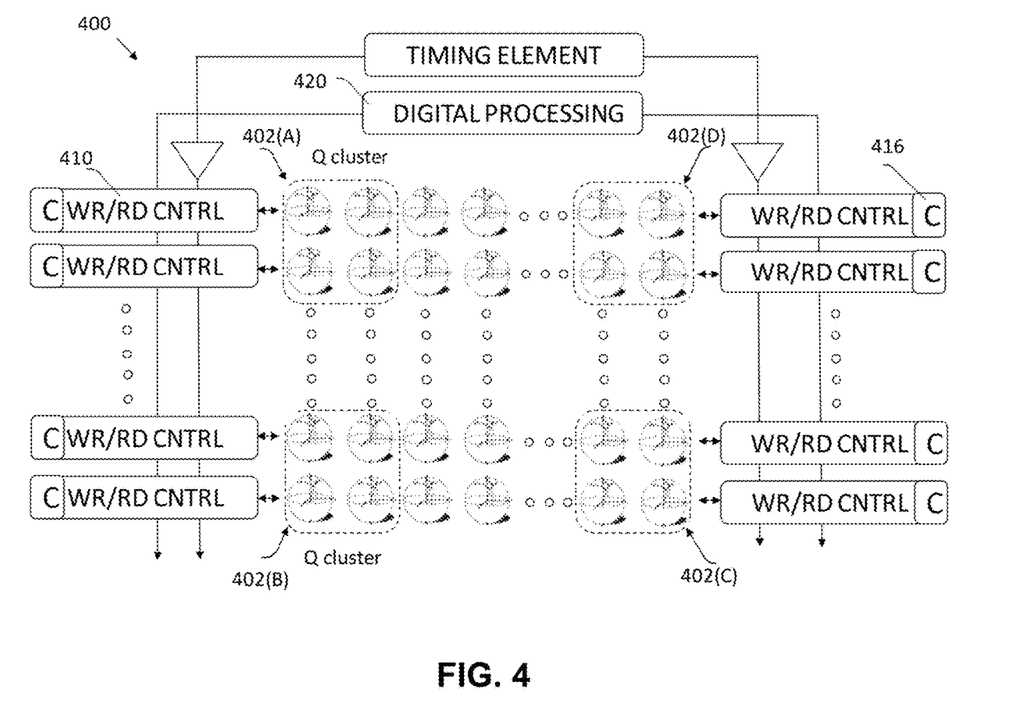
FIG. 4 is a block diagram of a dynamic range and power optimized programmable qubit array for quantum computing, consistent with an illustrative embodiment.

Reference now is made to FIG. 4, which is a block diagram of a dynamic range and power optimized programmable qubit array for quantum computing, consistent with an illustrative embodiment. The system 400 includes a plurality of clusters of qubits 402(A) to 402(D). An advantageous clustering is discussed in more detail later. The system includes a local channel low power phased locked loops (PLL), such as 416, for each write/read channel controller 410. There is a common reference clock for the entire system 400. There are digital control blocks such as 420, that may be shared between clusters. Each group of local channel low power PLLs receives a signal from the reference clock via its corresponding buffer.

As illustrated in FIG. 4, the architecture 400 provides an arrangement for multiple channels of qubit arrays. Each write/read controller (e.g., 410) provides band limited, single sideband pulses for a single qubit. Each WR/RD channel controller interfaces with its corresponding qubit and provides write pulses and reads the state information of the corresponding cluster. Signal processing is performed using CMOS transistor level circuits. In contrast to architecture 400, existing approaches utilize direct digitization of the signal. For example, the digital to analog converter is responsible for providing a frequency shift in addition to the specific waveform used to communicate with each qubit. Traditional approaches lead to generation of unique waveforms used to control each qubit, with center frequencies that are typically between 4-8 GHz. In traditional approaches, both the waveform, as well as the specific frequency offset, are realized using the digital to analog converter, thereby using higher current.

For example, a digital to analog converter may provide a 100 MHz signal, which is placed at a 450 MHz offset to its center. Accordingly, the highest bandwidth of the signal is 450+0.5*100=500 MHz. According to the Nyquist sampling theorem, the clock frequency should be at least 1000 MHz (i.e., twice the signal bandwidth). If this offset were not present, then the bandwidth would simply be 100 MHz, and a 200 MHz clock should have been sufficient. Thus, for the same bandwidth (i.e., information content of the signal), a frequency offset results in higher power consumption. A higher power DAC and a higher sampling frequency, is involved to provide a desired resolution of the DAC (e.g., 12-14 bit). Typically, a higher resolution DAC implies many channels to be communicated between the cryogenic chamber to the control logic that is outside the cryogenic chamber (e.g., room temperature). Alternatively, there could be one channel with significant fanout for all qubits. None of these are optimum choice for power, area, and scalability for a quantum system.

In contrast to known architectures, the teachings herein provide signals that are of much smaller bandwidth at baseband, and upconverts them using various offset frequencies generated from a local PLL. Using the previous example, a 100 MHz bandwidth is provided at 450 MHz offset vs 100 MHz with no offset. In one aspect, the teachings herein prevent wideband digitization with high power and is more suitable for low temperature. In one embodiment, a zero or low frequency offset implementation for the DAC is used, and a mixer is used to translate information from one frequency to another. For example, there are two ways to obtain a 100 MHz signal around a center frequency of 5.5 GHz. In a first approach, signals are digitized up to 1 GHz, and upconverted using a mixer with 6.5 GHz local oscillator (LO) frequency. In a second approach, signals are digitized up to 200 MHz, and either 5.7 GHz LO (lower sideband, 5.7−0.2=5.5 GHz) or 5.3 GHz LO (upper sideband, 5.3+0.2=5.5 GHz) are used. Hence, use of mixer reduces the clock frequency used in the digital to analog converter, and reduces power consumption.

The room temperature and low temperature electronics in the cryogenic chamber interface using very few wires. For example, since in one aspect the DAC is implemented with low power consumption, then it can reside in the cryogenic environment T2, and very few interconnects/cables need to be provided between the first temperature region T1 and the cryogenic chamber. All components of the WR/RD controllers are integrated in the control circuit block 113 within the cryogenic environment 110, thereby eliminating the large number of wires between the cryogneic environment and the first set of control electronics at room temperature.

Figure 5A:
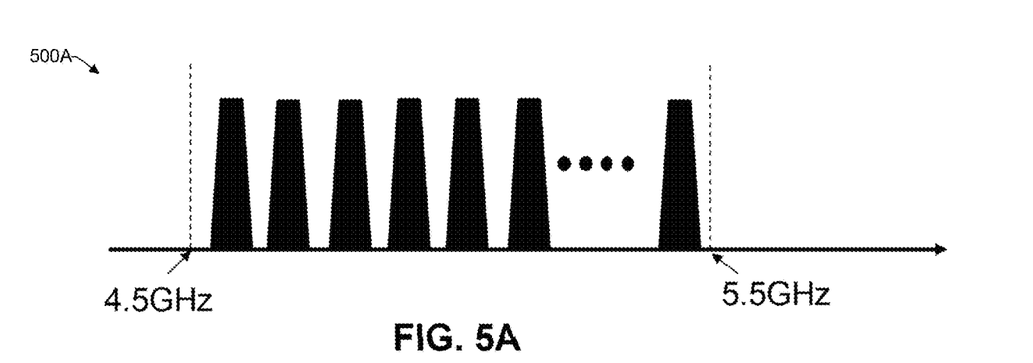
FIG. 5A illustrates example waveforms of a conventional approach in communicating with qubits.

Reference now is made to FIG. 5A, which illustrates example waveforms 500A of a conventional approach in communicating with qubits. Each trapezoid represents a center frequency of a qubit, which may lie between 4.5 GHz and 5.5 GHz. Thus, there is a wide range in resonant frequencies for different qubits. In today's technology, the center frequency Fc of a qubit may not be precisely known. Qubit technology is still at its infancy and developing a qubit having a predetermined frequency with high precision is a challenge. For example, in some scenarios, a consistent fabrication of a qubit to have a 5.20 GHz center frequency, may not be repeatedly achieved.

There typically is a center frequency, such as 5 GHz, and frequency offset is achieved in the digital domain, where the center frequency offset (e.g., difference between the midpoint of the trapezoid), as well as the information content of the signal (e.g., the width of the trapezoid) is combined (e.g., two waveforms multiplied) to provide the requisite center frequencies of each qubit. High power consumption results from the fact that the frequency offset leads to a higher frequency content to be digitized. In principle, digitization is more power consuming compared to less digitization and mixing thereafter, as discussed in the context of FIG. 5B below.

Figure 5B:
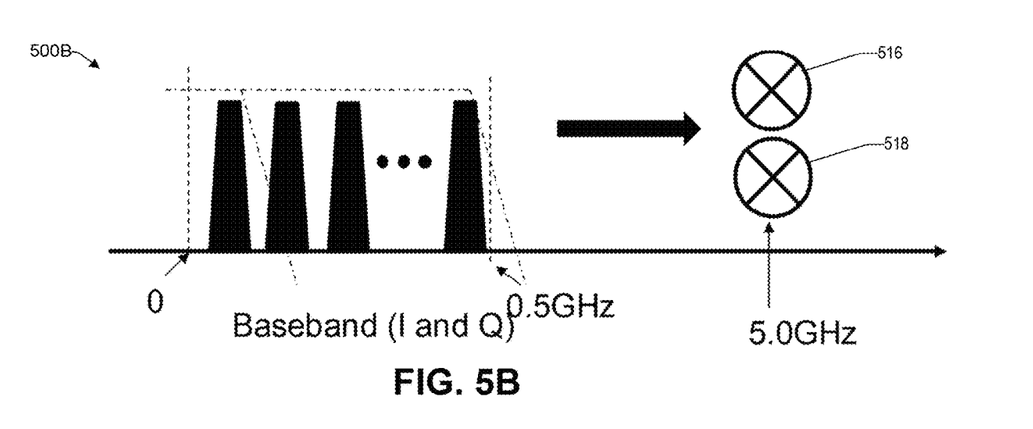
FIG. 5B illustrates a more efficient approach of communicating with a qubit, consistent with an illustrative embodiment.

In contrast, FIG. 5B illustrates a more power efficient approach of communicating with a qubit, consistent with an illustrative embodiment. Each qubit can be measured to determine what frequency can be used to excite a qubit (e.g. 5.27 GHz). This determination can be used to logically group the qubits as described herein. In other scenarios, where the center frequency of a qubit is more readily controlled during fabrication, the qubits can be physically grouped as described herein.

Once the center frequency of each qubit of a qubit array is determined, the qubit array is divided into different groups, where each group comprises a most diverse set of center frequencies of qubits. In this way, signals can be provided to each qubit with better fidelity and less interference. For example, an array of 16 qubits may include 4 qubits having a center frequency of 4 GHz, 4 qubits having a center frequency of 5.5 GHz, 4 qubits having a center frequency of 6 GHz, and 4 qubits having a center frequency of 7 GHz. The qubit array of 16 may be divided into groups of 4, each having a qubit having a center frequency of 4 GHz, 5.5 GHz, 6 GHz, and 7 GHz. In this way, the interference between the qubits is substantially reduced. In various embodiments the grouping discussed herein can be a logical grouping (based on a determination of each center frequency of a qubit in an array, while the qubits are in various locations of a chip) or physical grouping, where qubits are specifically configured to have a predetermined center frequency. The latter becomes increasingly more salient as qubit fabrication technology improves.

In the architecture related to waveforms 500B, two mixers 516 and 518 are used. The two mixers 516 and 518 are used to create different combinations of frequencies, including their sums and differences. In this way power is conserved.

Figure 6:
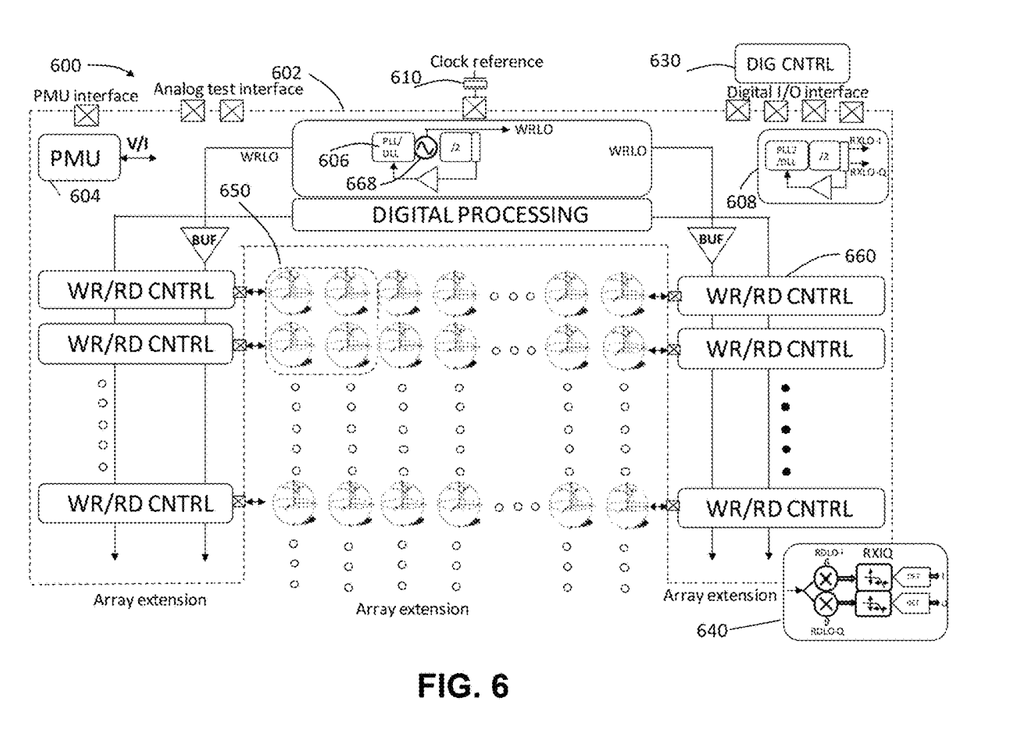
FIG. 6 is a conceptual block diagram of a dynamic range and power optimized programmable array for quantum computing, consistent with an illustrative embodiment.

FIG. 6 is a conceptual block diagram of a dynamic range and power optimized programmable array for quantum computing, consistent with an illustrative embodiment. System 600 includes components that operate at three different temperatures. In the example embodiment of system 600, the first set of control electronics 630 operate at a first temperature, which may be at room temperature. For example, the first set of control electronics 630 represents the measurements and control electronics 130 of FIG. 1. The remaining components are at different levels of cryogenic temperature. In one embodiment, the read controller (RXIQ) 640 is part of the control circuit block that is operated at a first cryogenic temperature (e.g., 1 to 4K), sometimes referred to herein as a second controlled temperature. Block 608 provides a clock source for a phase reference frequency that is in phase (I) and in quadrature (Q). It includes a phase locked loop (PLL) coupled to a divider network (e.g., divide by 2). The write and read controllers require quadrature clocks, hence, a divide by 2 circuit is used to provide a frequency division and quadrature generation with a 50% duty cycle.

The second control temperature includes various components depicted in block 602, excluding the qubit array 650, which is operated at a third controlled temperature (e.g., 240 mK) that is lower than the second controlled temperature (e.g., 1K to 4K). For example, the second control temperature may include a phase locked loop (PLL) or a delay locked loop (DLL) 606, and a power management unit 604, a write controller 660 for each qubit of the qubit array 650. There may be a clock source 610 coupled to the PLL/DLL block 606. There may be a single low power and low jitter oscillator 668. There may be a buffer 670 coupled between the PLL/DLL block 606 and the write controllers 660. There may be additional components as depicted in FIG. 6. It will be understood that the components of block 602 are presented by way of example only, and not by way of limitation. Alternate components as well as additional components can be used as well in the second controlled temperature.

Figure 7:
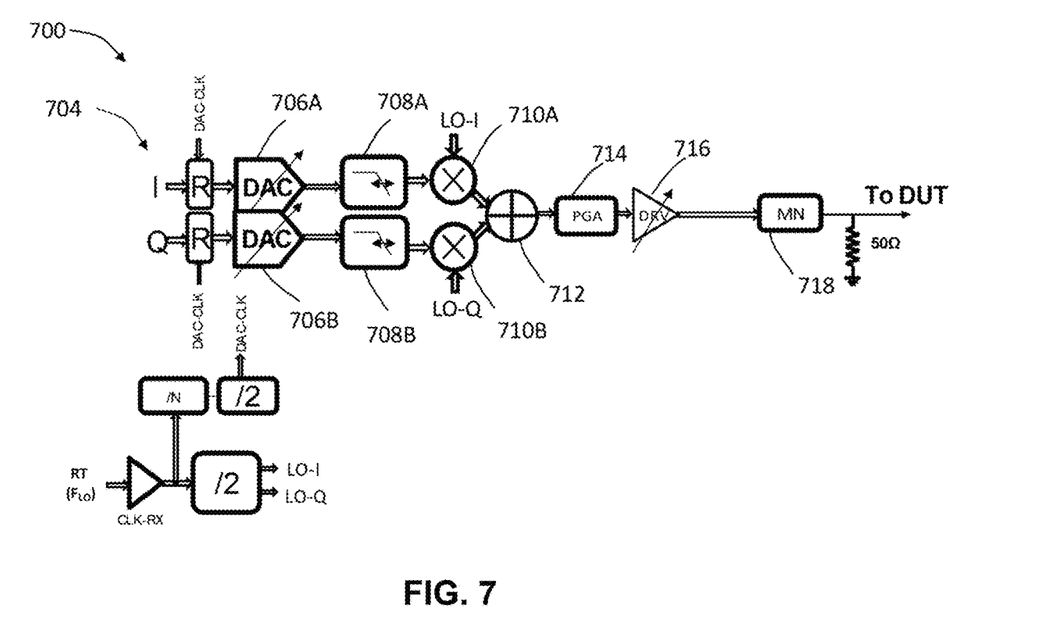
FIG. 7 illustrates a low power, single sideband write controller, consistent with an illustrative embodiment.
Figure 8:
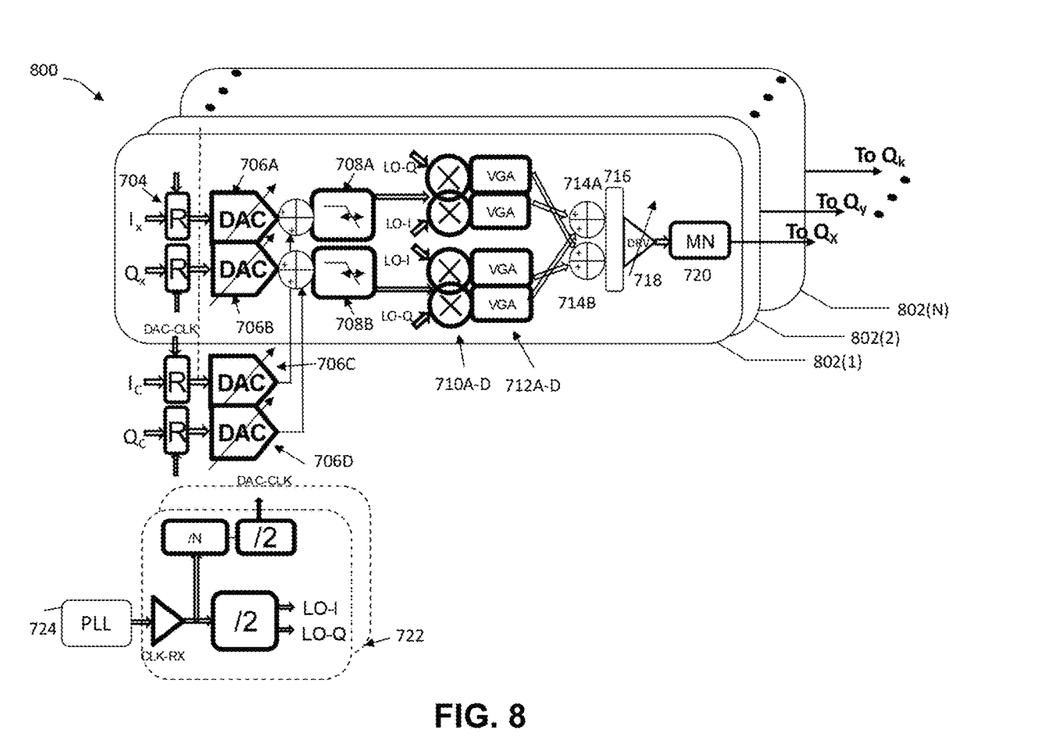
FIG. 8 illustrates a low power, single sideband write controller system, consistent with an illustrative embodiment.

Reference now is made to FIGS. 7 and 8, which illustrate a low power, single sideband write controller 700, and controller system having a plurality of write controllers 800, consistent with illustrative embodiments. FIGS. 7 and 8 are substantially similar, the main difference being FIG. 8 illustrating a plurality of write controllers 802(1) to 802(N). For simplicity, the main discussion will be with respect to FIG. 7, while it will be understood that similar concepts apply to FIG. 8 as well.

In FIG. 7, the write controller has a programmable output amplitude and provides a low jitter output. In one embodiment, the jitter is less than 100 fsec. The write controller 700 has a quadrature architecture in that it provides an in-phase input channel I and a quadrature input channel Q that is offset by 90 degrees, which are received by retime circuits (R) 704, respectively. Each channel is provided to a corresponding DAC 706A/B. In one embodiment, each DAC 706A/B is current mode. Each DAC 706A/B provides a "unique" part of a waveshape to a corresponding qubit. Regarding the term "unique," by way of example, consider that there are five waveforms, X1, X2, X3, X4, and X5, where each waveform is different in its envelope shape similar in other aspects. In this case, the unique part of the waveshape is given as the average of these N waveforms. This implies that the unique part is given by Xu=0.2*sum (X1:X5), and per channel DAC represents the difference in waveform Xdi=Xi−Xu, where i=1:1:5

In one embodiment, the DACs 706A and 706B are programmable for dynamic range using at least one of the parameters related to sampling rate (e.g., speed), resolution (e.g., number of bits), and supply voltage (e.g., impacts implementation choice of analog current source).

The individual write controllers 802(1) to 802(N) in FIG. 8 provide signals to the qubits. All write controllers 802(1) to 802(N) use a single clock from the single PLL, in order to ensure a substantially similar time of arrival of the signals to the individual qubits. The first block in the write controller includes a digital to analog converter (DAC) for each in phase (I) and quadrature (Q) path (i.e., DACS 706A and 706B), which convert a digital representation of the waveforms received at their corresponding inputs to a representative analog waveform. In addition to providing the baseband analog representation of the signal, each DAC 706A/B can provide an analog signal centered around a low intermediate frequency. For example, DAC 706A can provide a signal with 100 MHz bandwidth at a frequency offset of 450 MHz. This implies that the signal occupies frequency content of 400-500 MHz. In this process, there are clock spurious tones, which should be filtered out using a baseband filter. Accordingly, each write controller 802(1) to 802(N) includes a first signal processing element (e.g., 706C and 706D) configured to process a common part of a waveform shape for amplitude and phase, and a second signal processing element (e.g., 706A and 706B) that is configured to process a part that is individual to a qubit. In the example of FIG. 8, these processing elements are depicted as DACs 706A to 706D.

A clean signal after the baseband filter (e.g., 708A/B) is provided to the mixer (e.g., 710A-D), which upconverts to the desired frequency of the qubit. After the up conversion, a programmable gain function (e.g., 712A-712D) provides an appropriate amplitude to the qubit. During the process of digital to analog conversion, various Nyquist image frequencies are also generated in the system, which should be filtered out using the baseband filter. For a signal with bandwidth $f_{BB}$ and sampling clock frequency of $f_S$, the Nyquist image terms are located at $m^*f_S \pm n^*f_{BB}$, where, m and n are integer numbers with $\{m,n\}=\{1, 2, \ldots\}$.

In the mixing process, both single sideband mixing and double sideband mixing can be obtained. An example of double sideband mixing is provided by equation 1 below:

$$Y=G^*A_{BB}^*\cos(\omega_{BB}t)^*\cos(\omega_{LO}t)=G^*A_{BB}^*\{\cos(\omega_{LO}+\omega_{BB})t+\cos(\omega_{LO}-\omega_{BB})t\}. \quad \text{(Eq. 1)}$$

Where:
G represents the gain of the mixer; and
$A_{BB}$ represents the amplitude of the baseband signal at the mixer input.

Hence, in double sideband, both the frequency components, $(\omega_{LO}+\omega_{BB})$, and $(\omega_{LO}-\omega_{BB})$ are present. To reduce bandwidth, a single sideband can be used, which uses both in-phase and quadrature phases from the baseband and LO respectively, leading to the following output provided in equation 2 below:

$$Y_{LSB}=G^*A_{BB}[\cos(\omega_{BB}t)^*\cos(\omega_{LO}t)+\sin(\omega_{BB}t)^*\sin(\omega_{LO}t)]=G^*A_{BB}^*\cos(\omega_{LO}-\omega_{BB})t. \quad \text{(Eq. 2)}$$

Another implementation is provided by the relationship of equation 3 below:

$$Y_{LSB}=G^*A_{BB}[-\sin(\omega_{BB}t)^*\cos(\omega_{LO}t)+\cos(\omega_{BB}t)^*\sin(\omega_{LO}t)]=G^*A_{BB}^*\sin(\omega_{LO}-\omega_{BB})t. \quad \text{(Eq. 3)}$$

The relationship of equation 3 above is a lower sideband, as the resultant frequency, $(\omega_{LO}-\omega_{BB})$ is lower than the LO frequency, $\omega_{LO}$. Similarly, by rearranging the phases, the upper sideband can also be implemented, as provided by equation 4 below:

$$Y_{USB}=G^*A_{BB}[\sin(\omega_{BB}t)^*\cos(\omega_{LO}t)+\cos(\omega_{BB}t)^*\sin(\omega_{LO}t)]=G^*A_{BB}^*\sin(\omega_{LO}+\omega_{BB})t. \quad \text{(Eq. 4)}$$

Another implementation of an upper sideband is provided by equation 5 below:

$$Y_{USB}=G^*A_{BB}[\cos(\omega_{BB}t)^*\cos(\omega_{BB}t)^*\cos(\omega_{LO}t)]=G^*A_{BB}^*\cos(\omega_{LO}+\omega_{BB})t. \quad \text{(Eq. 5)}$$

Accordingly, by virtue of using both an upper sideband and a lower sideband, twice the frequency coverage can be achieved compared to just using either one of the sidebands. For example, a system that could provide frequencies of both $(\omega_{LO} \pm \omega_{BB})$, covers a $2\omega_{BB}$ frequency range compared to a system that can provide only $(\omega_{LO}+\omega_{BB})$ (the upper sideband) and $(\omega_{LO}-\omega_{BB})$ (the lower sideband).

In one embodiment, each output of the DAC 706A/B is filtered by an anti-aliasing filter 708A/B, sometimes referred to herein as a programmable integrated filter. Each filter 708A/B is programmable for gain, bandwidth and supply voltage.

The output of the filter 708A is mixed 710A with a corresponding local oscillator signal (e.g., LO2-I and LO2-Q, respectively), which may be summed or subtracted based on the desired center frequency. In one embodiment, each integrated multiplier 710A/B is programmable for single sideband vs. double sideband. Between these two modes, the integrated multiplier 710A/B provides signal conditioning and a gain step. In various embodiments, each integrated multiplier 710A/B may be configurable for upper and lower sideband, and/or provide either one of the upper and lower sidebands. In one embodiment, two separate multiplier mixers are used to obtain upper and lower sidebands separately. One of these sidebands is selected to the output with low latency.

The output of the arithmetic operation may be provided to a programmable gain amplifier (PGA) block 714. The programmable gain amplifier 714 is configured to process a unique part of a waveform shape for amplitude and phase to excite a qubit. For example, instead of placing a PGA 714 as in FIG. 7, in one embodiment, after the entire mixing operation is done, one PGA can be coupled to each of the mixer as illustrated by PGAs 714A and 714B in FIG. 8. Accordingly, vectoral addition can be performed by each write controller 802(1) to 802(N), as provided by way of example by equation 6 below:

$$Y=\alpha Xi+\beta Xq \quad \text{(Eq. 6)}$$

Where Xi and Xq are orthogonal signals that are a 90 degrees phase shifted version from each other.

There is a linear driver 716 coupled to the output of the PGA 714 operative to provide additional driving and enable/disable different stages of the driver 718 digitally. In some embodiments, a PGA 714 can be implemented using a single circuit biased with different current levels, with the output signal provided to a driver that comprises N stages, M out of which are selected using digital control, or a switchable array of cells inside the PGA 714 that scales the input signal and is programmed digitally. There is a matching network (MN) 718 to provide a maximum power transfer to the load (i.e., DUT or qubit) coupled to the output of the linear driver 716.

It should be noted that qubits generally use two types of waveshape to be excited, namely: (i) symmetric gaussian, and (ii) Derivative Removal by Adiabatic Gate (DRAG) framework. DRAG is a multi-transition variant of counterdiabatic driving, where multiple low-lying gapped states in an adiabatic evolution can be avoided simultaneously, greatly reducing operation times compared to the adiabatic limit. A DRAG pulse can be thought of as a maximally gaussian pulse having additional perturbations. If all qubits in an array of qubits use the same waveshape, only one programmable DAC may be used, which can be shared among N qubits, leading to lower power consumption. A common shared DAC (e.g., with reconfigurable resolution (e.g. number of bits) and power consumption) can provide a maximally gaussian shape. Such DAC can be current mode. In one embodiment, a DAC includes two parts: (i) an array of current sources, and (ii) a set of digital decoders to activate those current sources in the context of a current steering DAC, where a unit element of signal is current. Two example implementations of the reconfiguration discussed herein can be implemented. A first approach includes keeping a same resolution (e.g., number of bits), full scale current of the DAC can be adjusted. This approach leads to a change in the overall output current and reduces power consumption by reducing the overall current through the analog part.

A second approach includes keeping a same full-scale current level (e.g., a maximum current the DAC can provide when all the current sources are ON), where the number of bits in the DAC can be adjusted. The second approach leads to an adjustment in the current consumption of a digital section as well as in the analog section.

In one embodiment, the per-channel DAC 706 can be programmed independently from the common (e.g., shared) DAC. For example, there is a common DAC 706C for the in-phase signal, and a common DAC 706D for a quadrature signal. These signals are shared among the plurality of write controllers 802(1) to 802(N). The overall baseband current is obtained as a sum of the common shared DAC and the unique, per channel DAC (e.g., 708A and 708B), and the sum is provided to the mixer, for up conversion.

In one embodiment, each cluster of integrated circuit processing elements (e.g., of each write controller 802(1) to 802(N)) shares a same clocking element (e.g., PLL 724) 724. In each cluster of integrated circuit processing elements 802(1) to 802(2) comprising components 704, 706A/B, 708A/B 710A-D, 712A-D, 714A/B, 716, 718, and 720, sharing a plurality of clocking elements, the plurality of clock references are switched to the clock receiving and quadrature generator block 722 inside the unique signal channel.

In one embodiment, each integrated circuit signal processing element 802(1) to 802(N) includes a programmable digital to analog converter (DAC) 706A and 706B to process the in-phase signal (I) and or the quadrature-phase signal Q. There is a programmable integrated filter 708A coupled to the in-phase DAC 706A and a programmable integrated filter 708B coupled to the quadrature-phase DAC 706B. There is a programmable integrated multiplier 710A coupled to the in-phase analog filter 708A. A programmable integrated multiplier 710B is coupled to the quadrature-phase analog filter 708B. A programmable integrated multiplier 710C is coupled to the quadrature-phase analog filter 708C. A programmable integrated multiplier 710D is coupled to the quadrature-phase analog filter 708D. A variable gain attenuator (e.g., 712A-D) is configured to scale the signal output from the corresponding mixers (e.g., 710A-D). There is a programmable combiner (e.g., 714A, and 714B) for each-in phase (I) and quadrature (Q) path and configured to combine the signals from the in-phase and quadrature-phase multipliers 710A and 710B and create the single sideband signals for lower sideband (LO−RF) and upper sideband (LO+RF). A low latency selection element 716 selects between the upper and lower sideband signals and provides to the final driver 718. The final driver 718 is configured to provide a signal to the matching network element 720. In an alternate embodiment, the matching network 720 is shared among the channels (i.e., write controllers 802(1) to 802 (N)), thereby saving additional area and power.

In one embodiment, the baseband filter 708 of FIG. 7 (as well as the baseband filters 708A/B of FIG. 8) can each be implemented as a low power baseband filter on a per channel basis, while a moderate power baseband filter can be shared among all the channels of write controllers 802(1) to 802(N) to reduce power consumption.

A tunable network element, sometimes referred to herein as a matching network 720, is configured to provide maximum power transfer between each write controller 802(1) to 802(N) and its corresponding qubit, represented by Qx-Qk in FIG. 8.

Figure 9:
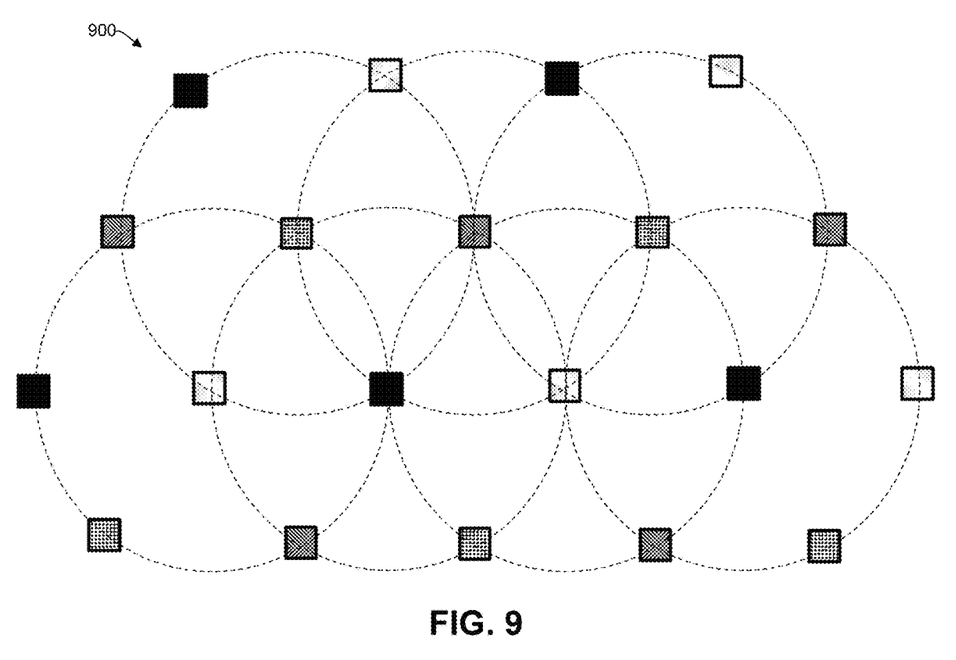
FIG. 9 is a block diagram of an example frequency planning of qubits of an array of qubits based on their center frequency, consistent with an illustrative embodiment.

In one embodiment, the qubit array comprises a plurality of clusters, each cluster being arranged to provide a maximum separation of resonance frequency to minimize cross talk between adjacent clusters. In this regard, reference is made to FIG. 9, which is a block diagram of an example frequency planning of qubits of an array of qubits based on their center frequency, consistent with an illustrative embodiment. This equally spaced, common centroid hexagonal arrangement provides an equal amount of physical separation between each qubit and its adjacent qubit. Each box in the arrangement 900 represents a qubit. Each box pattern represents a unique center frequency for qubits. A predetermined physical distance is maintained to minimize cross-talk between the different qubits. The distance between each qubit having a similar center frequency is maximized. In this way, deterministic cross-talk between one qubit to another is reduced.

In one embodiment, where the fabrication process is more controlled and the center frequencies can be configured, the center frequency can be set by the fabrication process itself. In other scenarios, where the fabrication process cannot predetermine the exact center frequency of the qubit, the grouping discussed herein is a logical (i.e., not a physical) grouping. For example, the determination of the center frequency is performed by providing a waveform of certain amplitude at a frequency and enabling the readout circuitry (e.g., 640 in FIG. 6). The mechanism of tuning the center frequency of a qubit includes a flux coupled arrangement, where an additional magnetic field is superimposed on the qubit under consideration.

For example, the determined center frequency of qubits is used to group the qubits. More specifically, the center frequency of each qubit of a qubit array is determined and the qubit array is logically divided into different groups, where each group comprises a most diverse set of center frequencies of qubits.

The patterns of each box representing a qubit indicates the various center frequencies. In the embodiment where the fabrication process is more controlled and can accurately dictate the center frequency, the qubits can be spatially arranged to provide a minimum interference to the adjacent and alternate adjacent qubits. This improves the fidelity of computation. In this way, signals can be provided to each qubit with better fidelity and less interference. Accordingly, the qubit chip implements qubits in a spatial fashion to minimize cross-talk between qubits and to provide signal fidelity. The arrangements can follow uniform spatial placements of the qubit resonators. Each qubit is separated from its adjacent qubit by equal distance. For example, if qubit Qn is surrounded by a number of qubits QA, QB, QC, QD, and QE, the interference term between each pair of {Qn,Qx}, x=A,B,C,D,E remain the same. Hence, when the qubit Qn is active, it is sufficient to send only one cancellation term (e.g., a replica of the main signal). Accordingly, if the desired signal is Yqn, the cancellation term is given as $\alpha*Yqn$. This term (signal=$\alpha*Yqn$) is sent to each of the Qx, and is summed up with the respective Qx signal to cancel the x-talk effect arising from spatial interference of Qn In view of the circular placement contours for static reciprocal cancellation of FIG. 9, since the x-talk is a static component, such arrangement provides a deterministic signal coupling, which can be readily cancelled in the current domain. Another advantage of this arrangement relates to the fact that only one term is sufficient to cancel cross-talk throughout the array (since the spatial distance between any two box patterns is constant throughout the qubit array). Such arrangement facilitates cross-talk cancellation terms, which can be implemented in current mode to preserve linearity.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A quantum processing system, comprising:
    a first set of control electronics operating at a first temperature;
    a second set of control electronics comprising an arbitrary waveform generator communicatively coupled to the first set of control electronics and operating at a second controlled temperature that is at a cryogenic temperature that is lower than the first temperature, the second set of control electronics comprising:
    one or more circuits configured to perform a write operation to one or more qubits; and
    one or more circuits configured to perform a read operation to the one or more qubits; and
    a qubit array comprising the one or more qubits and operating at a third controlled temperature that is lower than the second temperature, wherein the qubit array is controlled by the second set of control electronics.

2. The quantum processing system of claim 1, wherein the first temperature is substantially at room temperature.

3. The quantum processing system of claim 1, further comprising a first set of interconnects between the first and second set of control electronics, configured to at least one of: control, monitor, or provide one or more reference signals to the second set of control electronics, including at least one of a voltage reference, a current reference, or a clock reference, which do not scale with a number of qubits in the qubit array.

4. The quantum processing system of claim 3, further comprising a second set of interconnects between the second set of control electronics and the qubit array, configured to at least one of: monitor or provide dynamic signals to the one or more qubits of the qubit array, wherein there is one interconnect in the second set of interconnects for each of the one or more qubits of the qubit array.

5. The system of claim 1, wherein the second set of control electronics comprises a plurality of write controllers, wherein each write controller comprises an independently programmable qubit control circuit.

6. The system of claim 5, further comprising a first signal processing element configured to process a common part of a waveform shape for amplitude and phase, wherein each write controller includes a second signal processing element that is configured to process a part that is individual to a qubit.

7. The system of claim 6, wherein each independently programmable element of a write controller is configured to process a unique combination of amplitude and phase of a waveform shape for a corresponding qubit in the qubit array.

8. The system of claim 7, wherein:
the first signal processing element comprises a high-resolution digital to analog converter; and
the second signal processing element comprises a low-resolution digital to analog converter that is lower in resolution than the first signal processing element.

9. The system of claim 1, wherein the qubit array comprises a plurality of clusters, each cluster being arranged to provide a maximum separation of a resonance frequency of its corresponding qubit to minimize a cross talk between adjacent clusters of the plurality of clusters.

10. The system of claim 1, wherein the second set of control electronics is in complementary metal oxide semiconductor (CMOS) technology.

11. The system of claim 1, wherein the second set of control electronics is further configured to provide a power management circuit for the qubit array.

12. The system of claim 1, wherein the second controlled temperature is a cryogenic temperature that is between 1 to 4 Kelvin.

13. The system of claim 1, wherein the third controlled temperature is a cryogenic temperature of approximately 240 mK.

14. The quantum processing system of claim 1, wherein the qubit array is divided into groups, each group comprising a diverse set of center frequencies of qubits such that a cross talk between adjacent qubits is reduced.

15. The system of claim 1, wherein at least one of the one or more circuits configured to perform the write operation comprises two separate multiplier mixers to obtain an upper and a lower sideband separately.

16. A method of controlling an array of qubits, comprising:
operating a first set of control electronics at a first temperature;
operating a second set of control electronics comprising an arbitrary waveform generator communicatively coupled to the first set of control electronics at a second controlled temperature that is at a cryogenic temperature that is lower than the first temperature, the second set of control electronics comprising:
one or more circuits configured to perform a write operation to one or more qubits; and
one or more circuits configured to perform a read operation to the one or more qubits; and
operating a qubit array comprising the one or more qubits at a third controlled temperature that is lower than the second temperature, wherein the qubit array is controlled by the second set of control electronics.

17. The method of claim 16, wherein:
the first temperature is substantially at room temperature;
the second controlled temperature is a cryogenic temperature that is between 1 to 4 Kelvin; and
the third controlled temperature is a cryogenic temperature of approximately 240 mK.

18. The method of claim 16, further comprising:
providing a first set of interconnects between the first and second set of control electronics to at least one of: control, monitor, or provide one or more reference signals to the second set of control electronics, including at least one of a voltage reference, a current reference, or a clock reference, which do not scale with a number of qubits in the qubit array; and
providing a second set of interconnects between the second set of control electronics and the qubit array to at least one of: monitor or provide dynamic signals to the one or more qubits of the qubit array, wherein there is one interconnect in the second set of interconnects for each of the one or more qubits of the qubit array.

19. The method of claim 18, further comprising:
processing a common part of a waveform shape for amplitude and phase with a first signal processing element that is outside a plurality of write controllers; and
processing an individual portion of the waveform signal with a second signal processing element that is local to a write controller of the plurality of write controllers.

20. The method of claim 16, dividing the qubit array into groups, each group comprising a diverse set of center frequencies of qubits such that a cross talk between adjacent qubits is reduced.

* * * * *